May 14, 1963 — C. BAUR ET AL — 3,089,380
VARIABLE FRAMING MEANS FOR A COMBINED RANGE AND VIEW FINDER
Original Filed Dec. 10, 1957
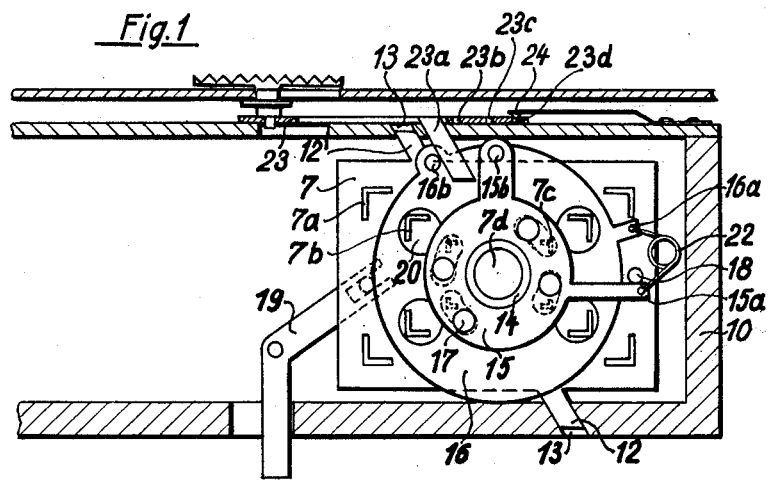
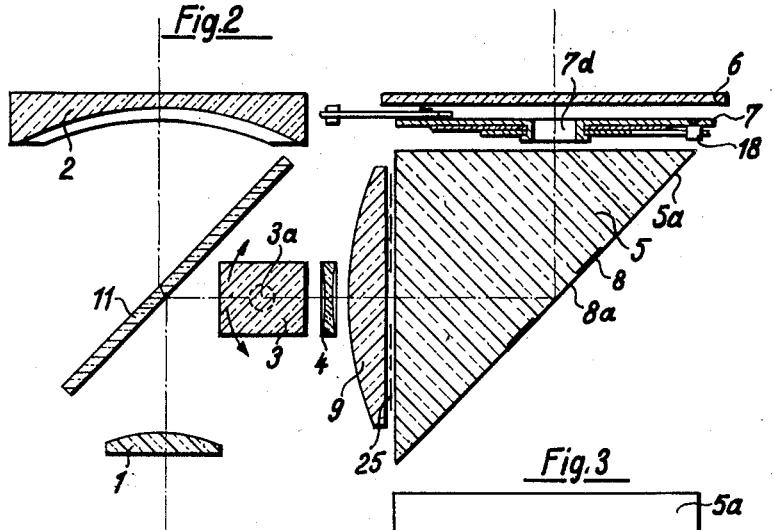
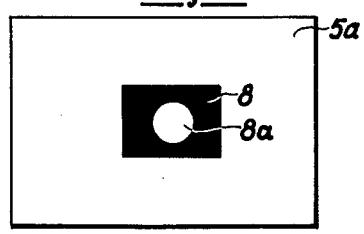
INVENTORS
CARL BAUR
GEORG KÖNIGL
BY Michael S. Striker
Attorney 3,089,380
VARIABLE FRAMING MEANS FOR A COMBINED
RANGE AND VIEW FINDER
Carl Baur, Baldam-Kolonie, and Georg Konigl, Munich-Pasing, Germany, assignors to Agfa Aktiengesellschaft, Leverkusen-Bayerwerk, Germany
Original application Dec. 10, 1957, Ser. No. 701,830, now Patent No. 3,041,919, dated July 3, 1962. Divided and this application Mar. 1, 1960, Ser. No. 12,107
Claims priority, application Germany Dec. 20, 1956
4 Claims. (Cl. 88—1.5)

The present invention relates to cameras.

More particularly, the present invention relates to a combined view and range finder for a camera.

This application is a division of our application Serial No. 701,830, filed December 10, 1957, entitled "Combined Range and View Finder," now Patent No. 3,041,-919, issued July 3, 1962.

One of the objects of the present invention is to provide for a camera capable of having objectives of different focal lengths interchangeably connected thereto a frame image means capable of providing frame images of different sizes corresponding to the focal lengths of the different objectives.

Another object of the present invention is to provide a collimator for the frame image means.

A further object of the present invention is to produce a structure in a combined range and view finder which is capable of producing the above objects and which at the same time is extremely compact as well as composed of relatively simple and rugged elements which are very reliable in operation.

With the above objects in view, the present invention includes in a combined range and view finder, a view finder means having an ocular and a range finder means cooperating with the view finder means for directing range finder light rays along a predetermined optical axis to the ocular. The present invention further includes a frame image means cooperating with the range finder means and ocular for producing a framing image, and in accordance with the present invention there is provided a lens means of positive refraction power spaced from the optical axis and cooperating with the ocular to act as a collimator for the frame image means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a partly sectional elevational view of a frame image means of the present invention;

FIG. 2 is a schematic sectional illustration of the combined range and view finder of the present invention; and FIG. 3 illustrates the reflecting face of a prism of the range finder.

Referring to FIG. 2, there is illustrated therein a view finder means which includes the view finder objective 2 and the ocular 1. A range finder means cooperates with this view finder means, and this range finder means includes the planoparallel element 3 which is supported for turning movement about the pivot axis 3a, this optical element 3 being turned by the operator in either direction, as indicated by the arrows of FIG. 2, in a purely conventional manner, when operating the range finder. The range finder means further includes a stationary lens 4 of negative refraction power and a prism 5. Instead of the stationary negative lens 4 and the turnable planoparallel element 3 it is possible to provide several lenses of which one is capable of being pivoted. A semi-transparent reflecting element 11 is located across the optical axis of the view finder. Thus, the view finding image is capable of passing through the objective 2 and the plate 11 to the ocular 1, while at the same time the range finding image is reflected by the plate 11 to the ocular 1.

In front of the entrance opening of the range finder means is located a transparent glass plate 6, as is conventional, and the portion of the plate 6 which is not used for the passage of range finder light rays is matted. A frame image means is located between the glass plate 6 and the prism 5 of the range finder means, the glass plate 6 being partially matted, as was pointed out above, and this frame image means include a plate 7 formed with different sets of cutouts corresponding to frames of different sizes, respectively, as well as masking discs 15 and 16, as described below. The different sets of cutouts for the frame of different sizes are illustrated at 7a, 7b, and 7c in FIG. 1. A central portion of the frame image means 7 is formed with a cutout 7d through which the range finder light rays pass unobstructedly along the optical axis of the range finder, as is evident particularly from FIG. 2. The plate 6 is only matted at its portions which are spaced from the optical axis and through which the range finding light days do not pass. The images produced by the sets of framing cutouts 7a–7c are reflected by the reflecting surface 5a of the prism 5 into the view finder.

In order to prevent light rays which pass through the cutouts 7a–7c from disturbing the range finding field, the reflecting surface 5a of the prism 5 is provided with a masked portion 8 which surrounds the unmasked portion 8a (FIGS. 2 and 3) where the range finder light rays are reflected along the optical axis, as indicated in FIG. 2. The masked portion 8, which may be provided by applying a coat of a suitable opaque lacquer or the like or by sanding a portion of the surface 5a so as to render it matted, prevents reflection of light rays which reach the masked portion 8, so that such light rays do not reach the eye. Moreover, this masked portion 8 cooperates with an additional mask 25 arranged between the lens 9 and the prism 5 for preventing the range finder image and framing image from overlapping. The holder for the negative objective lens 4 can be of such a shape and size that it will additionally serve the function of the mask 25 which in this case can be omitted. The mask 25 is so arranged between the elements 5 and 9 either on a surface of one or the other of these elements or else clamped between these elements that the framing image lines only can pass through the mask 25.

Contrary to the conventional arrangement of elements of a range finder, the objective of the range finder of the invention is divided into the element 4 of negative refractive power and the lens 9 of positive refractive power. As is evident from FIG. 2, the lens 9 extends beyond the region required for the range finder light rays and is unifocal. Only the central portion of the lens 9 through which the optical axis passes participates in the range finding function. Furthermore, the refractive power of the negative lens 4 and the positive lens 9 are so arranged that in cooperation with the ocular 1 they provide the same degree of afocality and magnification as the view finder. The outer annular portion of the lens 9 which surrounds its central range finder portion is not necessary for the range finder and instead cooperates with the view finder ocular 1 to act as a collimator for the frame image means 7. This arrangement has the advantage of providing when looking into the view finder a magnified bright frame image, and it is also possible to provide in the viewing field of the view finder framing images for relatively small pictures provided with objectives having focal lengths of 90 and 50 mm. as well as a framing image for a wide angle objective having a focal length of 35 mm.

The range finder housing 10 is shown in FIG. 1, and within this housing 10 a bell crank 19 is pivotally supported and has a free end portion extending beyond the housing 10 so that the operator may turn the bell crank 19. A bifurcated free end portion of the crank 19 receives a pin fixed to the plate 7 which is provided with the cutouts 7a–7c, and this plate 7 has extensions 12 and 12' respectively guided in the cutouts 13 of the housing 10, so that as the lever 19 is turned by the operator the position of the plate 7 will be adjusted. The projections 12 and 12' as well as the guides 13 extend parallel to the resulting parallax movement.

The plate 7 fixedly carries a sleeve 14 in its central portion, and it is the interior of this sleeve 14 which provides the opening 7d through which the range finder light rays pass without obstruction. The sleeve 14 serves to turnably support a pair of coaxial circular masking discs 15 and 16, which have already been referred to above. As may be seen from FIG. 1, these discs have different radii. The larger disc 16 is provided with four openings 20 which are adapted to respectively register with the cutouts 7b of the intermediate set of framing cutouts, as indicated in FIG. 1. The smaller disc 15 is provided with four cutouts 17 which are adapted to register with the smallest set of frame image cutouts 7c, when the disc 15 is turned to a predetermined angular position. It will be noted from FIG. 1 that the disc 16 is provided with arcuate slots which overlap the openings 17 so that when the disc 15 is turned through a relatively slight angle in a clockwise direction, as viewed in FIG. 1, the openings 17 will still be aligned with these arcuate slots and will be in register with the smallest sets of openings 7c.

The discs 15 and 16 respectively have integral projections 15a and 16a, and the ends of a hair spring 22 are respectively connected to the projections 15a and 16a and urge these projections toward each other. A pin 18 is carried by the plate 7 and serves as a stop for the projections 15a and 16a so as to limit the extent to which these projections may move toward each other under the influence of the spring 22. The stop 15a is shown in FIG. 1 in engagement with the projection or stop 18.

Furthermore, the masking discs respectively have stop pins 15b and 16b fixedly connected thereto, and if desired these discs may be manually turned one independently of the other by suitable levers arranged on the camera, connected to the discs, and accessible to the operator. In the embodiment which is illustrated in FIG. 1, however, the adjustment of the discs takes place through a single elongated manually operable member 23 which is capable of being longitudinally shifted by manipulation of the knob shown at the uppermost part of FIG. 1, this knob having a projection which passes through an elongated slot in the exterior wall of the camera. This projection is fixed to one end of the elongated member 23 which is guided for movement to the right and left, as viewed in FIG. 1, and which has fixed thereto an elongated projection 23a which is shiftable through a suitable slot formed in the wall of the range finder housing 10. The elongated member 23 is furthermore formed with a series of recesses 23b, 23c, and 23d which are respectively adapted to receive a projection 24 pressed by a suitable leaf spring into a selected one of these recesses. The projection 24 is conical so that the operator can at any time push the member 23 to displace the projection 24 from a recess, and then the operator can feel when the projection 24 snaps into the selected recess. As is apparent from FIG. 1, when the member 23 has been shifted to the position illustrated therein so that the projection 24 cooperates with the recess 23d, the projection 23a has engaged the pin 16b so as to turn the disc 16 to the angular position illustrated in FIG. 1 where the openings 20 are in register with the set of cutouts 7b. These framing cutouts 7b are used, for example, for an objective having a focal length of 50 mm. When the operator shifts the member 23 to the right, as viewed in FIG. 1, so that the projection 24 snaps into the recess 23c, the spring 22 will turn the disc 16 so as to cover the cutouts 7b, and the cutouts 7c are still covered by the disc 15, so that only the cutouts 7a are visible in the view finder image, and this position corresponds to a frame for the image provided by an objective having a focal length of 35 mm., for example. When the member 23 is shifted all the way to the right, as viewed in FIG. 1, so that the projection 24 engages in the recess 23b, then the disc 15 will have been turned in a clockwise direction by cooperation of the projection 23a with the pin 15b, so as to place the cutouts 17 in registry with the smallest set of framing cutouts 7c, and this set of framing cutouts corresponds to an objective having a focal length of 90 mm., for example.

It will be understood that each of the elements described above, or two or more together, may also find a useful application in other types of cameras differing from the types described above.

While the invention has been illustrated and described as embodied in combined range and view finders for cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a combined range and view finder, frame image means including a plate formed with sets of cutouts which respectively provide frame images corresponding to camera objectives of different focal lengths, respectively, and said frame image means including a plurality of masking discs selectively movable by the operator for uncovering the selected set of cutouts, said frame image means including a central hollow sleeve whose axis coincides with the range finder optical axis, said masking discs being of annular circular configuration and being turnable on said sleeve, said discs having different radii and said range finder light rays moving unobstructedly along said optical axis through said sleeve.

2. For use in a combined range and view finder, frame image means including a plate formed with three sets of framing cutouts producing image frames of different sizes and a pair of masking discs of different diameters turnably connected to said plate for being manually turned to angular positions where either the smallest set or the intermediate set of framing cutouts are aligned with additional cutouts formed in said masking discs; spring means cooperating with said discs for urging the latter to predetermined rest positions where the framing cutouts which cooperate therewith are covered; and manually operable means cooperating with a selected one of said pair of discs for moving the selected disc in opposition to said spring means to a position uncovering the framing cutouts which cooperate with the selected disc.

3. For use in a combined range and view finder, frame image means including a plate formed with three sets of framing cutouts producing image frames of different sizes and a pair of masking discs of different diameters turnably connected to said plate for being manually turned to angular positions where either the smallest set or the intermediate set of framing cutouts are aligned with additional cutouts formed in said masking discs; and a single longitudinally movable elongated manually operable means movable in one direction for engaging one of said discs for adjusting the same to cover or uncover a preselected one of said sets of cutouts and movable in an opposite direction for engaging the other of said discs for adjusting said other discs to cover or uncover another set of cutouts.

4. For use in a combined range and viewfinder, in combination, a plate formed with an opening end formed with a plurality of sets of framing cutouts arranged beyond said opening and symmetrically positioned with respect thereto, said sets of framing cutouts producing image frames of different sizes, respectively; a sleeve fixedly carried by said plate and aligned with said opening thereof so that range finder light rays can pass through said sleeve; and a plurality of discs turnably carried by said sleeve at the exterior thereof and located next to each other and adjacent to said plate, said discs being of different diameters and having a number equal to one less than the number of sets of framing cutouts and one of said sets of framing cutouts remaining at all times uncovered by said discs, said discs respectively being formed with openings which in different angular positions of said discs cooperate with said sets of framing cutouts to uncover a selected one of said sets of cutouts in addition to that one set which is at all times uncovered; and manually operable means cooperating with said discs for selectively turning the latter to positions which will cover either all except said one set of cutouts which remains uncovered at all times or which will additionally uncover a selected set of cutouts in addition to said one set which remains uncovered at all times.

References Cited in the file of this patent

UNITED STATES PATENTS

| | | |
|---|---|---|
| 2,737,844 | Jerome et al. | Mar. 13, 1956 |
| 2,805,608 | Leitz et al. | Sept. 10, 1957 |

FOREIGN PATENTS

| | | |
|---|---|---|
| 800,253 | Germany | Oct. 25, 1950 |
| 1,030,171 | Germany | May 14, 1958 |
| 1,043,798 | Germany | Nov. 13, 1958 |
| 386,353 | Great Britain | Jan. 19, 1933 |